United States Patent
Rauckman et al.

(10) Patent No.: US 9,787,071 B1
(45) Date of Patent: Oct. 10, 2017

(54) COVER FOR ELECTRICAL POWER DISTRIBUTION EQUIPMENT

(71) Applicant: Gato Assets, LLC, Belleville, IL (US)

(72) Inventors: James B. Rauckman, Swansea, IL (US); David W. McGuire, Jerseyville, IL (US)

(73) Assignee: Gato Assets LLC, Belleville, IL (US)

( * ) Notice: Subject to any disclaimer, the term of this patent is extended or adjusted under 35 U.S.C. 154(b) by 0 days.

(21) Appl. No.: 15/273,198

(22) Filed: Sep. 22, 2016

Related U.S. Application Data (63) Continuation of application No. 15/258,830, filed on Sep. 7, 2016, now abandoned.

(60) Provisional application No. 62/215,445, filed on Sep. 8, 2015.

(51) Int. Cl.
| | |
|---|---|
| *H02G 3/00* | (2006.01) |
| *H02G 3/08* | (2006.01) |
| *H02G 3/18* | (2006.01) |
| *H05K 5/02* | (2006.01) |

(52) U.S. Cl.
CPC .............. *H02G 3/081* (2013.01); *H02G 3/18* (2013.01); *H05K 5/0213* (2013.01)

(58) Field of Classification Search
CPC .......... H02B 13/00; H02B 17/36; H02G 7/00; H02G 3/24; H02G 15/34; H02G 3/00; H02G 3/081; H02G 3/18; H01R 4/66; H01R 4/68; H01B 17/00; H01B 17/34; H01B 12/00; H01B 17/26; H01B 17/54; H01B 17/36; B60R 16/0222; H01J 5/32; H01J 5/48; H01F 27/04; H05K 5/0213
See application file for complete search history.

(56) References Cited

U.S. PATENT DOCUMENTS

| | | | |
|---|---|---|---|
| 422,651 A | 3/1890 | Rosen | |
| 432,742 A | 7/1890 | Stanley | |
| 1,376,202 A | 4/1921 | Hart | |
| 1,486,417 A | 3/1924 | Cheely | |
| 1,641,081 A | 8/1927 | Heymann | |
| 1,766,636 A | 6/1930 | Holzel | |
| 2,065,315 A * | 12/1936 | Keath | H01B 17/26 123/169 P |
| 2,099,540 A | 11/1937 | Smith | |
| 2,234,391 A | 3/1941 | Taylor | |
| 2,421,151 A | 5/1947 | Johnstone | |
| 2,459,060 A | 1/1949 | Bush | |
| 2,483,874 A | 10/1949 | Bernhard | |
| 2,488,466 A | 11/1949 | Carver | |
| 2,493,107 A | 1/1950 | Bush | |

(Continued)

OTHER PUBLICATIONS

Rauckman Utility Products, Outage Protection Bushing Cover and Tube Closure, Published 2008, 2 Pages.

*Primary Examiner* — Pete Lee
(74) *Attorney, Agent, or Firm* — Senniger Powers LLP (57) ABSTRACT

A cover for covering at least a portion of electrical power distribution equipment, such as an open end of a conduit riser. The cover has a bottom opening for fitting over the open end of the conduit riser. The cover has an upper opening to allow egress of one or more wires from the open end of the conduit riser. The cover can be configured for fitting over conduit risers of various sizes and/or accommodating different numbers or sizes of wires. The cover can include ventilation openings for permitting egress of heat from the open end of the conduit riser.

18 Claims, 6 Drawing Sheets

(56) References Cited

U.S. PATENT DOCUMENTS

| | | |
|---|---|---|
| 2,513,141 A | 6/1950 | Carder et al. |
| 2,617,378 A | 11/1952 | Osol |
| 2,840,631 A | 6/1958 | Marcroft |
| 2,999,378 A | 9/1961 | Blair |
| 2,999,479 A | 9/1961 | Carder |
| 3,005,436 A | 10/1961 | Caldwell |
| 3,016,034 A | 1/1962 | Raistakka |
| 3,056,375 A | 10/1962 | Bernhard |
| 3,056,376 A | 10/1962 | Bender |
| 3,192,311 A | 6/1965 | Weinfurt |
| 3,194,203 A | 7/1965 | Thornton |
| 3,366,854 A | 1/1968 | Robinson |
| 3,410,936 A | 11/1968 | Juras |
| 3,510,568 A * | 5/1970 | Cochran ............... H02G 7/00 174/138 F |
| 3,525,073 A | 8/1970 | Calderon et al. |
| 3,753,416 A | 8/1973 | Haglund et al. |
| 3,824,676 A * | 7/1974 | Ebert ................... H02G 7/00 174/139 |
| 3,872,818 A | 3/1975 | Salvarezza |
| 4,053,707 A | 10/1977 | Ely et al. |
| 4,110,943 A | 9/1978 | Carlson |
| 4,110,944 A | 9/1978 | Carlson |
| 4,159,395 A | 6/1979 | Cogelia |
| 4,201,883 A | 5/1980 | Shepherd |
| 4,243,628 A | 1/1981 | Herold |
| 4,359,844 A | 11/1982 | Hoggard et al. |
| 4,465,263 A | 8/1984 | Robbins, Jr. |
| 4,467,387 A | 8/1984 | Bergh et al. |
| 4,500,595 A | 2/1985 | Gerteisen et al. |
| 4,535,197 A | 8/1985 | Butler |
| 4,570,564 A | 2/1986 | Salvarezza |
| 4,636,408 A | 1/1987 | Anthony et al. |
| 4,637,164 A | 1/1987 | Brown |
| 4,664,971 A | 5/1987 | Soens |
| 4,707,562 A | 11/1987 | Whited |
| 4,731,507 A | 3/1988 | Torimoto et al. |
| 4,755,633 A | 7/1988 | Standing |
| 4,788,633 A | 11/1988 | Zimermann et al. |
| 4,803,819 A | 2/1989 | Kelsey |
| 4,804,717 A | 2/1989 | Ramey et al. |
| 4,845,307 A | 7/1989 | Cumming et al. |
| 4,860,996 A | 8/1989 | Robbins, III |
| 4,906,801 A | 3/1990 | Beasley |
| 4,973,029 A | 11/1990 | Robbins, III |
| 5,008,148 A | 4/1991 | Thurm et al. |
| 5,023,406 A | 6/1991 | Thornley |
| 5,115,104 A | 5/1992 | Bunyan |
| 5,170,750 A | 12/1992 | Ricketts |
| 5,293,721 A | 3/1994 | Richard et al. |
| 5,293,835 A | 3/1994 | Shagoury |
| 5,299,528 A | 4/1994 | Blankenship |
| 5,326,947 A | 7/1994 | Edds et al. |
| 5,347,769 A | 9/1994 | Dinsmore |
| 5,359,313 A | 10/1994 | Watanabe et al. |
| 5,437,749 A | 8/1995 | Pipkorn et al. |
| 5,446,242 A | 8/1995 | Barrett |
| 5,525,073 A | 6/1996 | Sampson |
| 5,570,652 A | 11/1996 | Ferland |
| 5,644,641 A | 7/1997 | Ikeda |
| 5,648,641 A | 7/1997 | Guthrie |
| 5,650,594 A | 7/1997 | Urnovitz |
| 5,679,922 A | 10/1997 | Harben |
| 5,682,015 A | 10/1997 | Harben |
| 5,794,495 A | 8/1998 | Anderson |
| 5,834,686 A | 11/1998 | Barrett et al. |
| 5,864,096 A | 1/1999 | Williams et al. |
| 5,873,324 A | 2/1999 | Kaddas et al. |
| 5,884,426 A | 3/1999 | Ishida |
| 6,005,196 A | 12/1999 | Spillyards |
| 6,161,289 A | 12/2000 | Alexander |
| 6,248,956 B1 | 6/2001 | Cook et al. |
| 6,250,023 B1 | 6/2001 | Donoho |
| 6,255,597 B1 | 7/2001 | Bowling et al. |
| 6,283,611 B1 | 9/2001 | Sharrah et al. |
| 6,291,774 B1 | 9/2001 | Williams |
| 6,314,914 B1 | 11/2001 | Betzen |
| 6,453,775 B1 | 9/2002 | Dietrich et al. |
| 6,533,881 B1 | 3/2003 | Wall |
| 6,571,517 B2 | 6/2003 | Wulff et al. |
| 6,668,458 B1 | 12/2003 | Schoenleber |
| 6,683,249 B1 | 1/2004 | Leppin |
| 6,809,266 B1 * | 10/2004 | Hoi ..................... H02G 1/085 174/135 |
| 6,878,883 B1 | 4/2005 | Rauckman |
| 6,881,901 B2 * | 4/2005 | Egan ................... H02G 15/013 16/2.1 |
| 7,075,015 B1 * | 7/2006 | Rauckman ............ H02G 7/00 174/135 |
| 7,622,668 B1 * | 11/2009 | Tollefson ............ H01B 17/00 174/135 |
| 7,839,256 B2 * | 11/2010 | Bradford ............ H01B 17/00 174/135 |
| 2002/0175000 A1 | 11/2002 | Wright |
| 2003/0015330 A1 | 1/2003 | Wood et al. |
| 2003/0046882 A1 | 3/2003 | Homer et al. |
| 2003/0140735 A1 | 7/2003 | Weaver et al. |
| 2004/0184210 A1 * | 9/2004 | Lynch ................. H01H 31/006 361/104 |
| 2004/0221456 A1 | 11/2004 | Losinger |
| 2005/0034884 A1 | 2/2005 | Lee |
| 2011/0083896 A1 * | 4/2011 | Hiller ................. H01B 17/00 174/5 R |

* cited by examiner

COVER FOR ELECTRICAL POWER DISTRIBUTION EQUIPMENT

CROSS REFERENCE TO RELATED APPLICATION

This application is a continuation of U.S. patent application Ser. No. 15/258,830, which claims priority to U.S. Provisional Patent Application No. 62/215,445, filed Sep. 8, 2015, the disclosures of both of which are hereby incorporated by reference in their entireties.

FIELD

The present disclosure relates to electrical power distribution apparatus. More particularly, it relates to a cover for electrical power distribution equipment.

BACKGROUND

Figure 1:
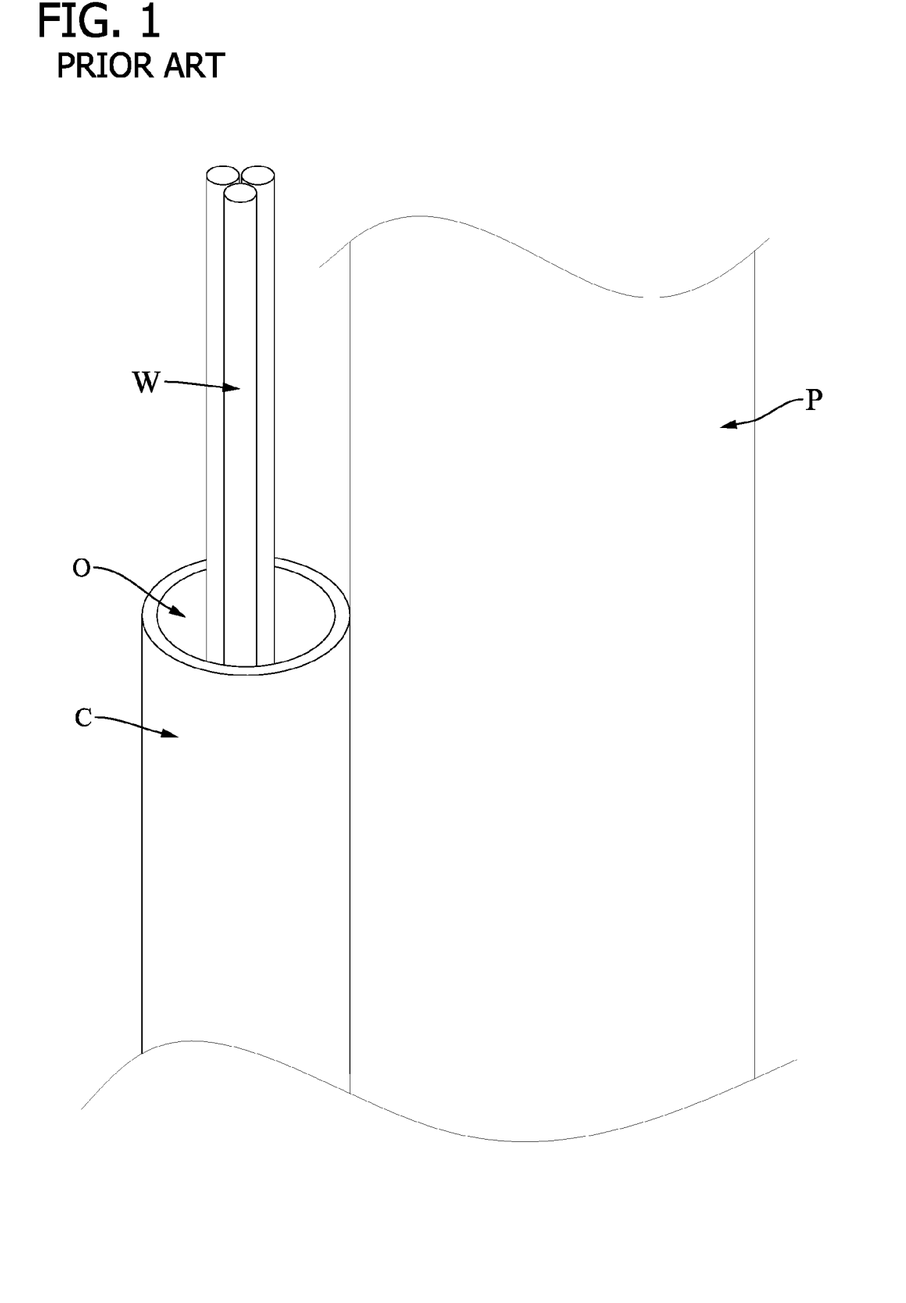
FIG. 1 is a perspective of a prior art conduit riser housing wires positioned adjacent a utility pole.

As seen in FIG. 1, in many instances a utility pole P which bears charged lines or wires for electrical distribution systems includes a conduit riser C positioned adjacent to the pole to house ascending electrical distribution lines or wires W. The conduit riser C comprises a generally cylindrical pipe having an opening O at its top. The conduit riser C may have a diameter in an inclusive range of from about 1.5 inches to about 5 or more inches. The conduit riser C generally extends from the ground partway up the pole P such that the wires W adjacent to the ground are covered and protected. Because substantial heat can build up within the conduit riser C, the conduit riser is left open to allow ventilation and dissipate heat.

It is not uncommon for squirrels, birds or other pests to build nests and the like in the open end O of the conduit riser C. In the case of squirrels, the animals will hoard nuts and store them in the conduit riser C. If dense enough, these objects will block air flow and ventilation such that heat build-up within the conduit riser C can cause a fire, with resulting electric failure. Squirrels may damage the wires W and conduit riser C when they attempt to retrieve their stored nuts.

It would be advantageous, therefore, to have a means for covering the open end O of the conduit riser C to prevent access by pests but still allow sufficient ventilation. It also would be advantageous to have such means that will fit on conduits having different diameters.

SUMMARY

In one aspect, the present disclosure is directed to a cover for covering electrical distribution equipment having at least one wire extending therefrom. The cover includes a hollow body having a bottom opening configured to fit over at least a portion of the electrical distribution equipment. The body includes a plurality of first flexible members bounding the bottom opening. The first flexible members are configured to yield to accommodate electrical distribution equipment of various diameters. An upper segment of the cover has an upper opening for passage of the at least one wire from the electrical distribution equipment. The upper opening is smaller than the bottom opening. The upper segment includes a plurality of second flexible members bounding the upper opening. The second flexible members are configured to allow egress of the at least one wire through the upper opening.

BRIEF DESCRIPTION OF THE DRAWINGS

Corresponding reference characters indicate corresponding parts throughout the drawings.

DETAILED DESCRIPTION

Figure 4:
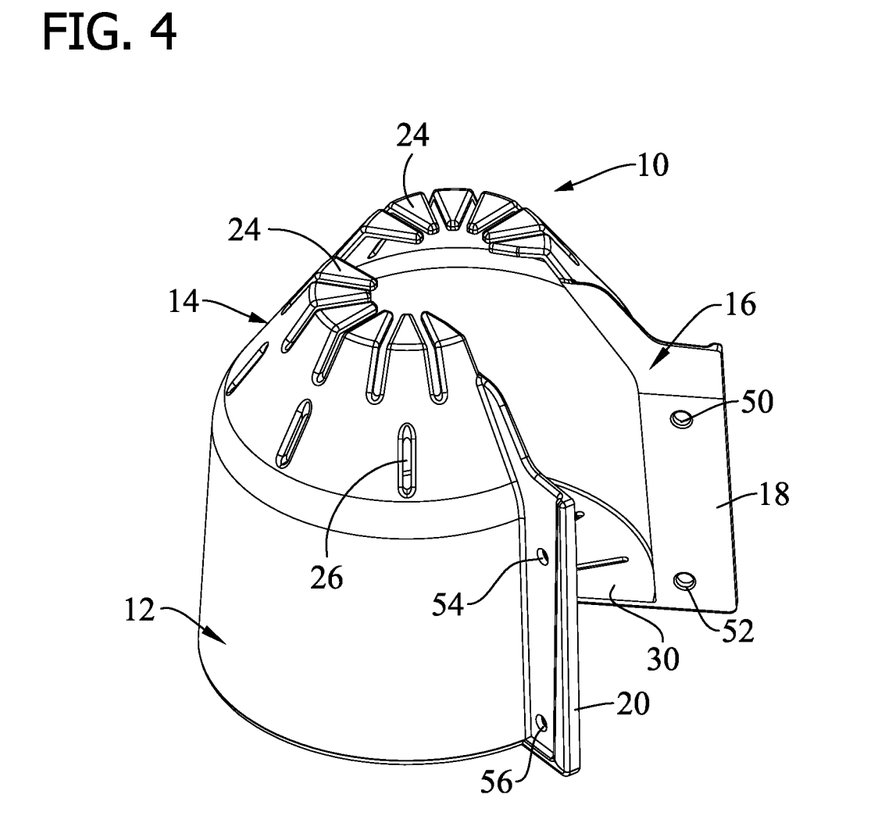
FIG. 4 is a top perspective thereof showing the cover in an open configuration for installation.

A conduit riser cover is indicated in the drawings by reference number 10. The cover 10 comprises a substantially cylindrical body 12 having a frusto-conical top segment 14. The body 12 defines a slit 16. There are opposed flanges 18 and 20 on each side of the slit. The cover 10 can be molded or otherwise constructed from a resilient, non-conductive material, such as a polymer or any other appropriate material. The nature of the material allows the cover 10 to be spread open at slit 16 as shown in FIG. 4 for mounting over the open end of a conduit riser C. It will be understood that the shape of the conduit riser cover 10 may be other than shown herein within the scope of the present invention. Although the cover can be beneficially employed with a conduit riser, it can be used to cover other electrical distribution equipment such as an insulated bushing of a transformer, cable terminator and the like.

Figure 2:
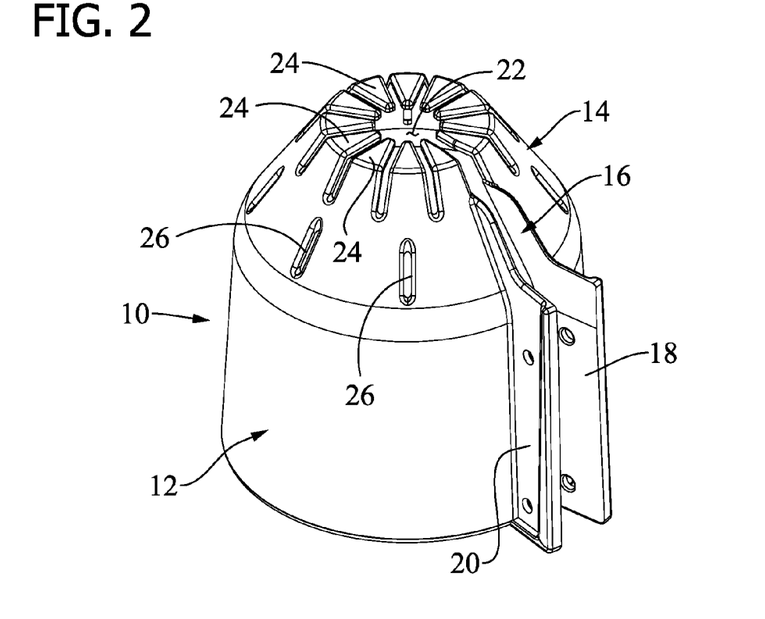
FIG. 2 is a top perspective of a conduit riser cover of the present disclosure.
Figure 5:
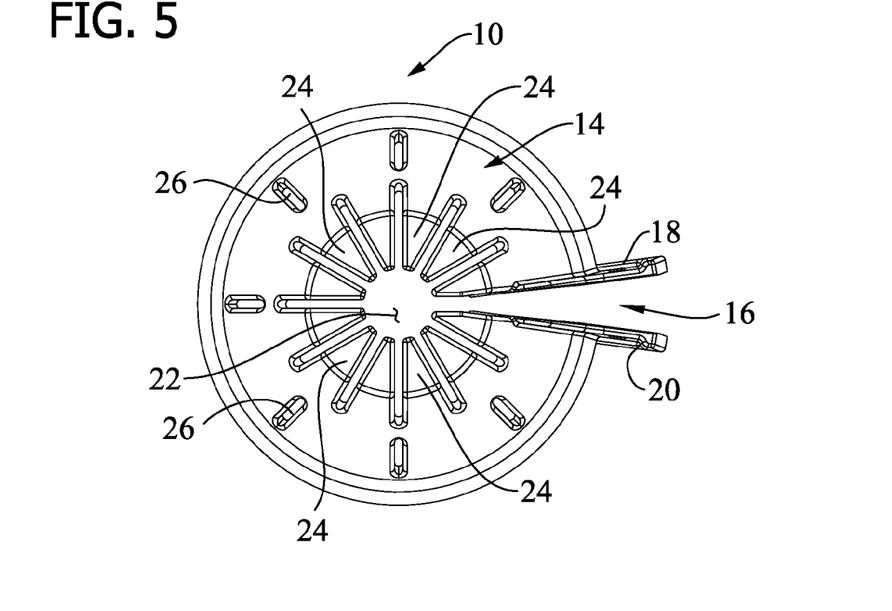
FIG. 5 is a top view of the conduit riser cover.

As seen in FIGS. 2 and 5, the top segment 14 includes an opening 22. The opening 22 is generally circular and is bounded by distal ends of a plurality of inwardly disposed members or fingers 24. The members or fingers 24 are flexible and allow the opening 22 to increase in size to accommodate different diameter electric wires W. Gaps between the fingers 24 form ventilation openings in addition to providing for flexing of the fingers. The top segment 14 also defines a separate plurality of ventilation openings 26 to allow airflow and the egress of hot air out of the cover.

Figure 3:
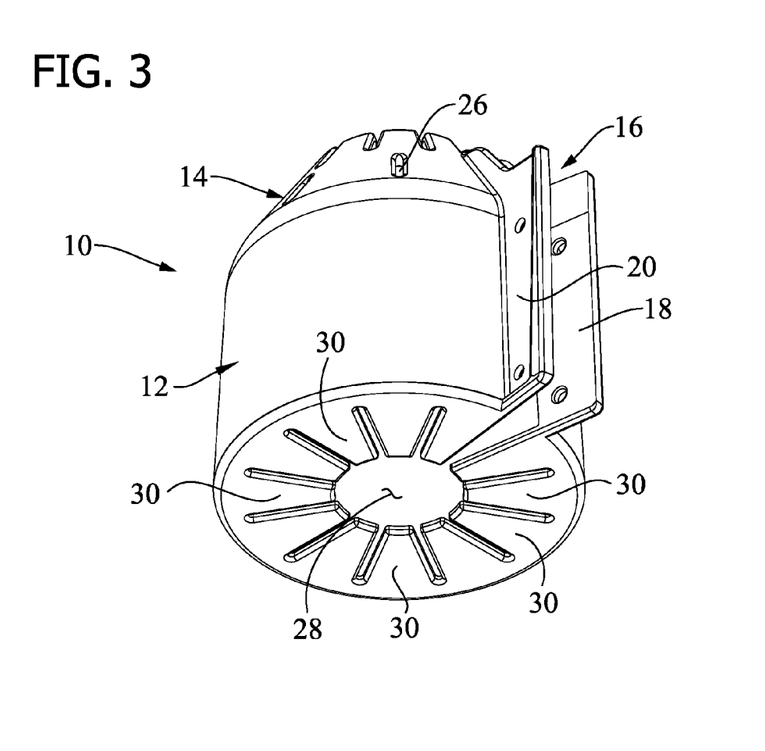
FIG. 3 is a bottom perspective thereof.
Figure 6:
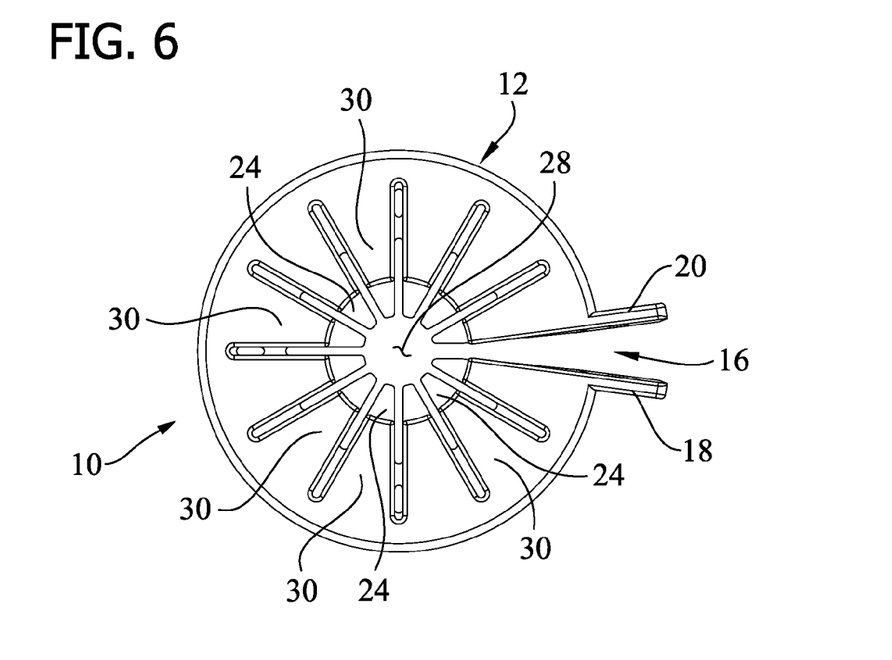
FIG. 6 is a bottom view thereof.

As seen in FIGS. 3 and 6, the body 12 includes a bottom opening 28. The opening 28 is bounded by distal ends of a plurality of inwardly disposed members or fingers 30. The members or fingers 30 are flexible and allow the opening 28 to conform to or fit on different diameter conduits (e.g., conduits in the inclusive range of from about 1.5 inches to about 5 inches in diameter).

Figure 7:
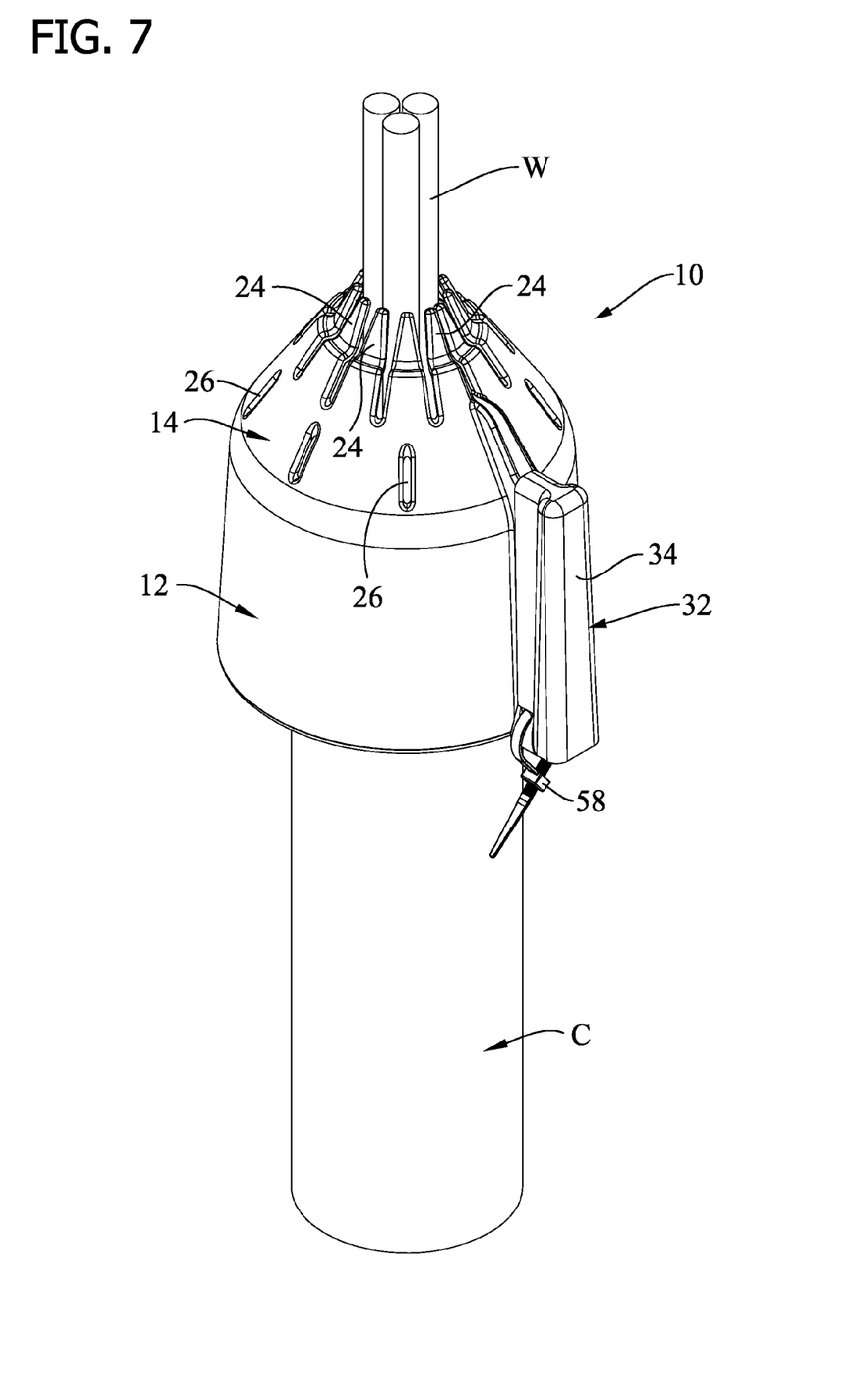
FIG. 7 is a perspective view of the cover mounted on a conduit riser and secured in position.

FIG. 7 illustrates the cover 10 installed over the upper opening of the conduit riser C. In installation, the cover 10 is opened at slit 16, as shown in FIG. 4, to encompass the wires W and the upper end of the conduit riser C. As noted previously herein, the flexible fingers 24 allow the cover 10 to encompass one or more wires W and seat snugly around the wires. As the conduit riser cover 10 is being applied to the conduit riser C, the electric wires W engage the fingers 24 and deflect them as required so that the wires may pass through the top of the conduit riser cover. The resiliency of the fingers 24 assures that while the size of the opening 22 may change, the ends of the fingers remain in engagement (or in a close spacing) to inhibit pests from accessing the conduit riser C. Similarly, the flexible fingers 30 can flex through engagement with the conduit riser C as the conduit riser cover is being applied to the conduit riser to change the size of the opening 28 and allow the cover to encompass the upper end of conduits of different diameters and seat snugly around the conduit. The finger 30 may flex to accommodate a typical range of conduit riser sizes of from about 1.5 to 5 inches. It will be understood that conduit risers outside of this size range may be accommodated by the fingers within the scope of the present invention. Thus, pests cannot access the conduit riser C open top by entering through the bottom of the conduit riser cover 10.

Figure 8:
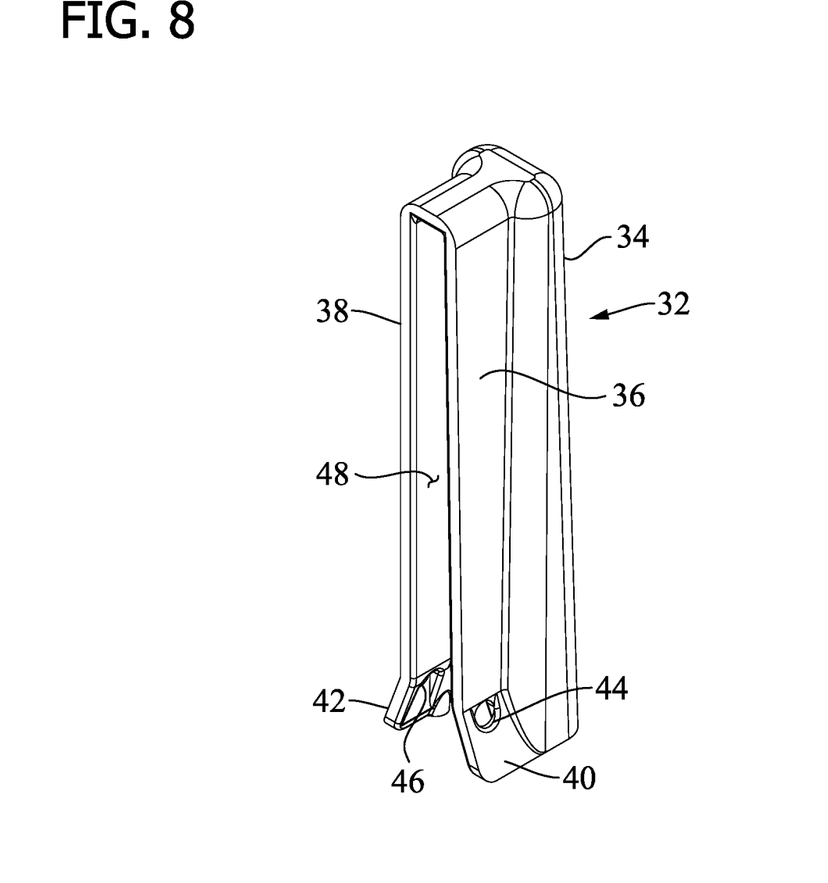
FIG. 8 is a perspective of a locking slide for the conduit riser cover.

As seen in FIG. 7, the cover 10 is locked in place by a slide 32 (broadly, "closure member"), which is shown in greater detail in FIG. 8. The slide 32 is configured for sliding down over the flanges 18 and 20 to secure them together to secure the slit closed. The slide 32 includes a substantially flat face plate 34, two perpendicular inner walls 36 and 38 that terminate at outwardly sloped ends 40, 42, respectively, that include securing openings 44 and 46, respectively. The walls 36 and 38 define a channel 48 that is dimensioned to seat the flanges 18 and 20. In this aspect, as seen in FIG. 4, the flanges 18 and 20 include securing openings 50, 52, 54, and 56. In the illustrated embodiment, the openings 44 and 46 align with the openings 52 and 56, and an additional securing means, such as a zip tie 58 can be threaded through the openings.

It will be noted that in lieu of the slide 32, securing means can be introduced through the openings 50 and 54 and/or the openings 52 and 56. In addition to, or instead of, a securing means such as the zip tie 58 or the like, a tag or other identifying indicia can be attached to the cover through the holes in the flanges or the holes in the slide 32.

As can be seen in the figures, when the cap 10 is mounted in place, there are a plurality of ventilation openings or gaps between the flexible upper fingers 24 and between the lower fingers 30, as well as ventilation openings 26. The ventilation openings allow airflow through the cover 10. The cover 10 prevents access by squirrels, birds, or other varmints into the upper open end the conduit riser C.

It will be apparent that modifications and variations are possible without departing from the scope of the appended claims. It is intended that all matter contained in the above description and shown in the accompanying drawings shall be interpreted as illustrative and not in a limiting sense.

What is claimed is:

1. A cover for covering electrical distribution equipment having at least one wire extending therefrom, the cover comprising: a hollow body having a bottom opening configured to fit over at least a portion of the electrical distribution equipment, the body including a plurality of first flexible members bounding the bottom opening, the first flexible members being configured to yield to accommodate electrical distribution equipment of various diameters; an upper segment having an upper opening for passage of the at least one wire from the electrical distribution equipment, the upper opening being smaller than the bottom opening, the upper segment including a plurality of second flexible members bounding the upper opening, the second flexible members being configured to allow egress of the at least one wire through the upper opening; wherein the upper segment includes a plurality of ventilation openings for permitting egress of heat from the electrical power distribution equipment through the ventilation openings, the ventilation openings include holes in the upper segment spaced from gaps formed between the second flexible members.

2. The cover as set forth in claim 1, wherein the upper segment tapers inward from the body toward the upper opening.

3. The cover as set forth in claim 1, wherein the plurality of first flexible members comprise flexible fingers having distal ends bounding the bottom opening.

4. The cover as set forth in claim 1, wherein the plurality of second flexible members comprise flexible fingers having distal ends bounding the upper opening.

5. The cover as set forth in claim 1, wherein the body and upper segment have a side slit extending between the bottom and upper openings permitting the body to be installed over said at least a portion of the electrical power distribution equipment.

6. The cover as set forth in claim 5, further comprising locking means for securing the cover on said at least a portion of the electrical power distribution equipment.

7. The cover as set forth in claim 1, wherein the body is generally cylindrical.

8. The cover as set forth in claim 1, wherein the upper segment is generally frusto-conical.

9. The cover as set forth in claim 1, wherein the first plurality of flexible members are configured to yield to accommodate portions of electrical power distribution equipment having outside diameters in the inclusive range from about 1.5 inches to about 5 inches.

10. The cover as set forth in claim 1, wherein the second flexible members include respective first portions, the first portions being arranged in a frusto-conical pattern before installation of the cover on the electrical distribution equipment.

11. The cover as set forth in claim 1, wherein the second flexible members each include a first portion and a second portion, the first flexible members being bent such that the second portion extends at an angle with respect to the first portion before installation of the cover on the electrical distribution equipment.

12. The cover as set forth in claim 1, wherein the second flexible members each have an outward facing surface and an opposite inward facing surface, the inward facing surfaces of the flexible members being concave before installation of the cover on the electrical distribution equipment.

13. The cover as set forth in claim 1, wherein the first flexible members have gaps therebetween and the first flexible members have generally triangular shapes including truncated free ends such that the free ends are wider than the gaps between the first flexible members.

14. A cover for covering electrical distribution equipment having at least one wire extending therefrom, the cover comprising: a hollow body having a bottom opening configured to fit over at least a portion of the electrical distribution equipment, the body including a plurality of first flexible members bounding the bottom opening, the first flexible members being configured to yield to accommodate electrical distribution equipment of various diameters; an upper segment having an upper opening for passage of the at least one wire from the electrical distribution equipment, the upper opening being smaller than the bottom opening, the upper segment including a plurality of second flexible members bounding the upper opening, the second flexible members being configured to allow egress of the at least one wire through the upper opening; wherein the body and upper segment have a side slit extending between the bottom and upper openings permitting the body to be installed over said at least a portion of the electrical power distribution equipment; the cover further comprising outwardly extending flanges on opposite sides of the slit; the cover further comprising a closure member configured to fit over the flanges for securing the slit closed; wherein the closure member is configured to slide over the flanges; wherein the flanges have openings each flange has at least one opening therein, and the closure member has at least one opening therein, the openings of the flanges and the closure member being configured to align when the closure member is received over the flanges for reception of a tie through the aligned openings.

15. The cover as set forth in claim 14, wherein the flanges have lengths extending along a height of the body, and the closure member is configured to slide along the length of the flanges to capture the flanges.

16. The cover as set forth in claim 14, wherein the at least one opening of the closure member includes first and second openings, and the first and second openings of the closure member are configured to align with the openings of the flanges when the closure member is received over the flanges for reception of a tie through the aligned openings.

17. The cover as set forth in claim 11, wherein the first portions of the second flexible members are arranged in a frusto-conical pattern before installation of the cover on the electrical distribution equipment.

18. The cover as set forth in claim 17, wherein the second portions of the second flexible members define free ends of the second flexible members.

\* \* \* \* \*